United States Patent
Stierle et al.

(10) Patent No.: US 6,917,414 B2
(45) Date of Patent: Jul. 12, 2005

(54) DEVICE FOR DISTANCE MEASUREMENT

(75) Inventors: Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/433,555

(22) PCT Filed: Aug. 14, 2002

(86) PCT No.: PCT/DE02/02974

§ 371 (c)(1),
(2), (4) Date: Jun. 4, 2003

(87) PCT Pub. No.: WO03/031911

PCT Pub. Date: Apr. 17, 2003

(65) Prior Publication Data

US 2004/0051865 A1 Mar. 18, 2004

(30) Foreign Application Priority Data

Oct. 5, 2001 (DE) .......................... 101 49 144

(51) Int. Cl.⁷ .......................... G01C 3/08; G01S 13/08; G01S 15/00
(52) U.S. Cl. ...................... 356/4.01; 356/5.01; 356/5.1; 342/118; 367/99
(58) Field of Search .............................. 356/3.01–5.15; 342/118, 146; 367/99, 130

(56) References Cited

U.S. PATENT DOCUMENTS

| | | | |
|---|---|---|---|
| 5,092,670 A | * | 3/1992 | Preston .................. 352/140 |
| 5,930,904 A | | 8/1999 | Mualem |
| 6,226,076 B1 | | 5/2001 | Yoshida |
| 6,324,888 B1 | | 12/2001 | Schmidt |
| 6,624,881 B2 | * | 9/2003 | Waibel et al. ........... 356/4.01 |
| 2002/0067475 A1 | * | 6/2002 | Waibel et al. ........... 356/4.01 |
| 2004/0078163 A1 | | 4/2004 | Bogel et al. |

FOREIGN PATENT DOCUMENTS

| | | |
|---|---|---|
| CH | 249300 | 4/1948 |
| DE | 31 22 483 A1 | 3/1982 |
| DE | 198 09 683 A1 | 9/1999 |
| EP | 0 738 899 A1 | 10/1996 |
| WO | 94/27164 | 11/1994 |
| WO | 02/50564 A2 | 6/2002 |

OTHER PUBLICATIONS

"Disto" Operating Instructions from LEICA Geosystems AG, 9435 Heerbrugg, Switzerland, 1994, pp 1–46.

* cited by examiner

Primary Examiner—Stephen C. Buczinski
(74) Attorney, Agent, or Firm—Michael J. Striker

(57) ABSTRACT

The invention relates to a device for distance measurement, comprising a housing (24) which is provided with an integrated emitting unit (32) for a measuring signal (34, 36) and a receiving unit (38) for the measuring signal (34, 36) returned from a target object (16), and an evaluation unit (46) for determining the distance (d) between at least one reference point (14) of the housing (24) and the target object (16, 18), a display device (50) which reproduces said distance (d), and at least one receiving element (28) which is connected to the housing (24) and receives a holding element (12, 13) of the device.

According to the invention, means (66, 84, 86) are provided in or on the housing (24) of the device (10) for detecting an inserted holding element (12, 13) for the housing (24). Said means automatically transmit the reference point (14) of the distance measurement to the evaluation unit (46), said reference point being used for a measurement with the aid of said holding element (12, 13).

9 Claims, 4 Drawing Sheets

DEVICE FOR DISTANCE MEASUREMENT

The present invention is based on a device for distance measurement according to the preamble of the independent claim.

BACKGROUND OF THE INVENTION

Distance measuring devices as such have been known for some time. Said devices emit a modulated measuring beam, e.g., a light beam or an ultrasonic beam, that is directed toward a desired target object or a target surface to determine the distance between which said target and the device. Part of the measuring signal that is reflected or scattered, returned by the located target surface is detected again by the device, and it is used to determine the searched-for distance.

The range of application of distance measuring devices of this type generally covers distances in the range of a few centimeters to many hundred meters. Measuring devices of this type are now sold commercially in compact configurations and enable simple, hand-held operation by the user. Moreover, the devices can also be equipped with tripods or holding elements sold as accessories, for example, or they can be equipped for a static measuring process, which is particularly advantageous for taking very exact measurements or measuring very long distances to target objects.

To determine very short distances in particular, it is necessary to assign an unequivocal reference point or reference plane to the measuring device, which said reference point or reference plane being used as the starting point for calculating the distance from the measuring device to the desired target object. With known distance measuring devices found on the market, this reference point is located, e.g., in a housing edge extending at a right angle to the beam direction, such as in the front side of the housing or in the back end of the housing. The user must make certain that the measuring device is positioned during the measuring process such that the reference point or the reference plane of the measuring device intersects exactly with the zero point of the path it will measure.

An opto-electronic hand-held measuring device for measuring distance is made known in WO 94/27164 and in the "Disto" operating instructions from Leica Geosystems AG, 9435 Heerbrugg, Switzerland, 1994. Distances to an object can be measured optically with said device. The distance to the object can be measured starting at either an anterior or posterior measurement stop of the distance measuring device. The front and back housing surfaces of the distance measuring device—which are configured at a right angle to the direction of measurement—generally serve as measurement stops (reference points of the device). A separate measurement button on the keypad of the measuring device is assigned to each of the possible measurement stops, i.e., the two internal reference points. When said measurement buttons are actuated, a distance measurement is triggered with the reference point associated with the actuated button, and the measured distance value is then displayed in the display on the device.

A hand-held device for distance measurement and coordinate determination using geodetic measurements is made known in DE 31 22 483 A1. In order to create a simple and lightweight hand-held device for short-range measurements, said device comprises, among other things, an adjustable stand capable of being attached to the distance measuring device in a plane that is perpendicular to the direction of measurement. The height-adjustable stand made known in DE 32 22 483 A1 has a double function. On the one hand, it ensures that the measuring device can be held in the hand without shaking and, on the other hand, it ensures that the distance measuring device is centered on a reference point on the ground. The disclosed distance measuring device must be placed along with its stand in the zero point (reference point) of the path to be measured.

In the case of an advantageous configuration of the device made known in DE 31 22 483 A1, the stand is detachably connected to the distance measuring device and also comprises a level vial with bushing to control its perpendicular position.

An auxiliary housing for holding a normally hand-held distance measuring device is made known in DE 198 09 683 A1. Said auxiliary housing is configured as a hollow body and comprises a receptacle for insertion of a distance measuring device. The auxiliary housing is equipped with a threaded bushing for mounting the housing part on a tripod. The longitudinal axis of the threaded bushing for the tripod holder coincides with an abutment surface of the distance measuring device operating as a reference plane when said device is properly inserted in the auxiliary housing. In this manner, the reference point for a distance measurement with the aid of the tripod is equal to the reference point of the hand-held distance measuring device. It is not necessary for the user to change the reference points.

In the case of the distance measuring device disclosed in DE 198 09 683 A1 as well, the user must make certain that the internal reference plane coincides with the zero point of the path he is measuring. Furthermore, in the case of DE 198 09 683A1, if a measuring device is not inserted completely into the holder, the length measurement is faulty, because the measured path started at an incorrect zero point (reference point).

ADVANTAGES OF THE INVENTION

In contrast to the devices in the prior art, the device according to the invention has the advantage that the fact that the reference point or the reference plane for the distance to be measured has been changed is automatically transmitted to the evaluation unit of the measuring device when a mechanical holding element is used. With the device according to the invention, it is no longer necessary for the user to change the reference plane to be taken into account—which, if he forgot to do this, inevitably resulted in measurement errors. In advantageous fashion, the measuring device itself recognizes which reference plane should be used. The only thing left for the user to do is to position the measuring device in suitable fashion.

The means provided in the measuring device for detecting an inserted holding element for the housing, as represented, e.g., by a tripod, a mechanical component adapter or a measuring device receiving element, comprise at least one detector and at least one switching means. The detector registers whether a tripod has been screwed in, for example, or if the distance measuring device is coupled to a further component via an adapter, which therefore means that a static, i.e., not a hand-held, measurement is going to be carried out with the use of a mechanical holding element. A corresponding switching signal is transmitted from a switching means—which can be a switch, for example—to the evaluation unit of the measuring device, which registers the new reference point of the measuring device for the distance measurement and, after the measurement is completed, it calculates the distance between the target object and said new reference point of the device.

In a first, advantageous exemplary embodiment of the device according to the invention, the detector and the switching means are integrated in a mechanical switch. If the distance measuring device with its female thread integrated in the housing is screwed onto a tripod or a component adapter, for example, a mechanical pushrod—which is inserted inwardly into the device when a threaded bolt of the tripod is screwed in—actuates a mechanical switch in the device. Said switch closes a current circuit, for example, so that a corresponding signal indicating that the reference point is changed can be forwarded to the evaluation unit.

A metallic threaded bolt is used in a further, advantageous exemplary embodiment of the device according to the invention. The housing of the distance measuring device according to the invention then has a split, metallic threaded bushing, for example. Each of the two halves of the threaded bushing is interconnected with a corresponding electronic switching circuit of the distance measuring device. When the metallic threaded bolt is screwed in, the two threaded bushing parts are interconnected in electrically conductive fashion, thereby closing a current circuit. The signal produced in this fashion is transmitted to the evaluation unit and evaluated as described hereinabove.

A further advantageous exemplary embodiment of the claimed distance measuring device according to the invention provides that, in the case of a holding receiving element composed of plastic configured as an internal thread, for example, the screwing-in of a threaded bolt belonging to the holding element is detected capacitively. A corresponding detector registers the capacitance which is changed when a holding element is screwed in and transmits this information accordingly to the evaluation unit.

A magnetic detector, such as a Hall sensor, can also be used in advantageous fashion in the device according to the invention to detect a screwed-in holding element.

In a particularly advantageous exemplary embodiment of the device according to the invention, the reference point being used for a measurement is reproduced in a display on the measuring device that is recognizable by the user in every case. The user is therefore informed directly about the reference point from which the current measurement was just carried out. Erroneous measurements caused by the reference edge (reference plane) being placed incorrectly are therefore largely prevented. The device is therefore distinguished by simple, user-friendly operation.

The device for distance measurement according to the invention can be realized in the form of a laser distance measuring device, for example. Laser distance measuring devices of this nature are used to obtain an exact measured value, especially when long distances to target objects are involved, frequently with the use of a tripod. In advantageous fashion, the exemplary embodiment of a laser distance measuring device according to the invention makes it possible to perform a measurement easily without changing the reference edge for different measuring tasks. Further advantages of the device according to the invention result from the drawings and the associated description.

SUMMARY OF THE DRAWINGS

Exemplary embodiments of the device according to the invention are presented in the drawings, and they are explained in greater detail in the subsequent description. The exemplary embodiments of the device are presented in simplified, schematic fashion in the drawings. The description, the figures, and the claims contain numerous features in combination. One skilled in the art will also consider these features individually and combine them into further, reasonable combinations.

DESCRIPTION OF THE PREFERRED EMBODIMENTS

Figure 1:
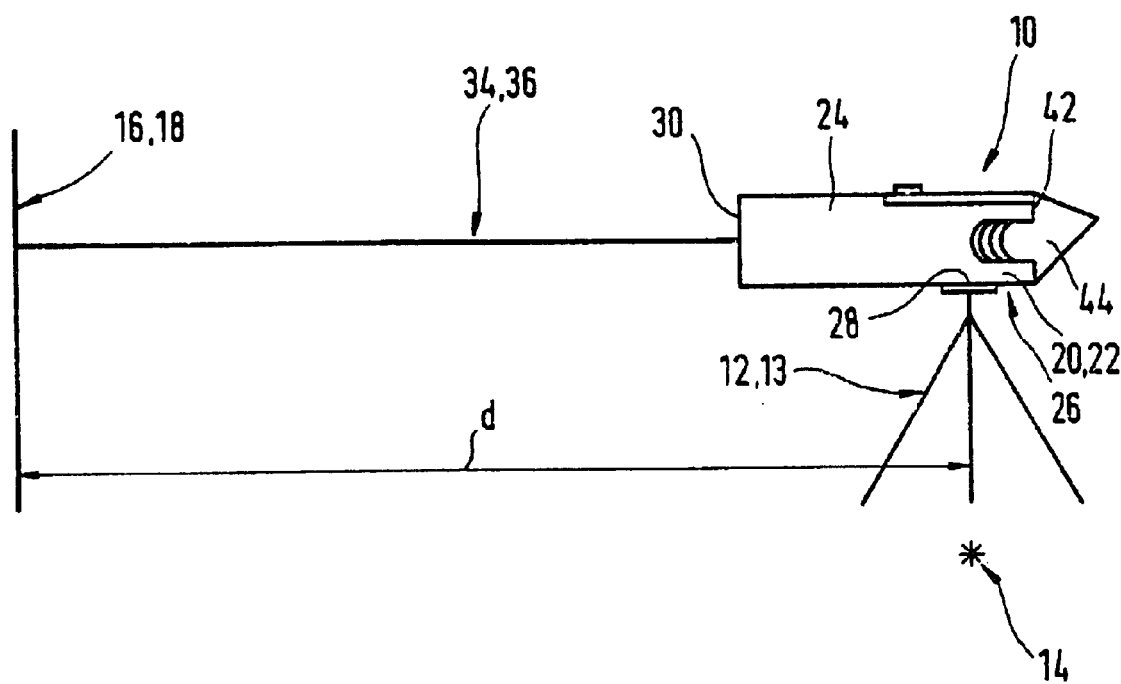
FIG. 1 shows a schematic measuring set-up employing a tripod for an exemplary embodiment of the device according to the invention.

FIG. 1 shows a simplified, schematic representation of a typical measuring setup for the distance measurement comprising a device 10 according to the invention employing a tripod 12 as mechanical holding element 13 for the device 10. The purpose of a measurement of this type is to determine the distance d between a reference point 14 and a target object 16, which is shown in simplified form in FIG. 1 in the form of a target surface 18.

For this purpose, a distance measuring device 20—which is presented in the form of a laser distance measuring device 22 in the exemplary embodiment in FIG. 1—is situated with its housing 24 on a tripod 12. A receiving element 28 for the tripod 12 is located on a housing underside 26 of the laser distance measuring device 22. The distance measuring device 20 can be screwed onto the tripod 12, for example, or it can be reversibly interconnected with the tripod 12 by means of an appropriate plug connection. Further types of connections known to one skilled in the art are also possible. The distance measuring device 20 is positioned on the reference point 14 with its tripod 12 by means of a known method.

A modulated laser beam 34, as the measuring signal 36, which is produced by a not-shown emitting unit 32, emerges from the housing 24 out of a housing front side 30 of the device 10 according to the invention. Said laser beam 34 is partially reflected by the target object 16, passes through a collimating optics unit and re-enters the housing 24 of the distance measuring device 20, where it is detected in a receiving unit 38, and the path covered by the light 34 is determined, e.g., based on the transit time of the light or a corresponding phase displacement of the measuring signal 36.

In the case of hand-held distance measuring devices, such as those used for interior finishing work in buildings, for example, the searched-for path to the target object is usually calculated from an edge of the housing of the device outward. To accomplish this, the zero point of a path to be measured, that is, the reference point 14 of the measurement, is equated in the factory to a housing front side 30 or to an edge on the housing backside 42, and the path covered by the measuring signal is calculated from said internal reference point outward. To create a defined reference point, a locating flap 44 can also be provided in the device 20, which said locating flap can be extended and therefore provide a clearly visible reference point for the measurement.

Generally, when a tripod is employed, the zero point of the path measurement is not located in the zero point of the measuring device for hand-held operation. The resultant difference between the two measurement paths determined accordingly must be calculated by the user himself, and the user must have corrected the measuring set-up accordingly.

Figure 2:
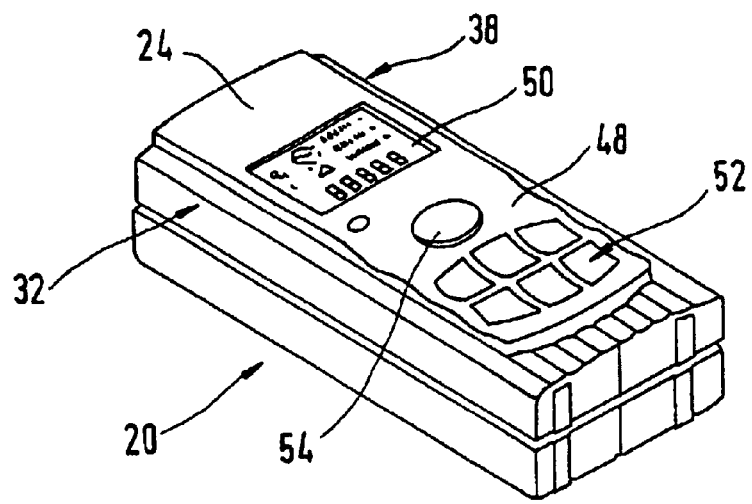
FIG. 2 shows a laser distance measuring device according to the invention as viewed at an angle from above during mounting on a tripod.
Figure 2:
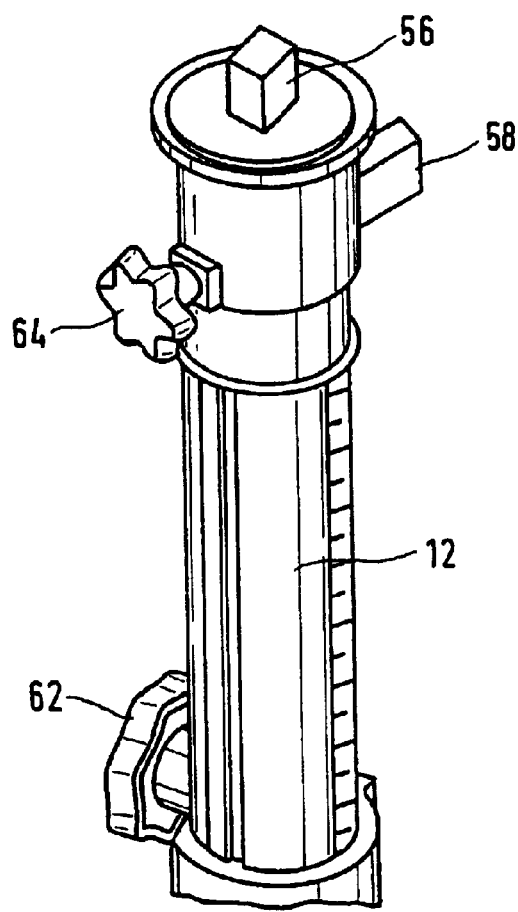

FIG. 2 shows an exemplary embodiment of a distance measuring device 20 during mounting on a tripod 12. The measuring device 20 is equipped with an emitting unit 32 located in the housing 24 to emit a measuring signal 36. The emitting unit 32 can be a not-shown laser diode including a collimation lens, for example, with the aid of which the measuring signal is bundled. Furthermore, the distance measuring device 20 comprises a receiving unit 38 with a not-shown lens that receives the measuring signal 36 reflected on the target object or the scattered, returned measuring signal 36 and directs it to an opto-electric converter, for example. The converter, which can be configured as a photodiode, in particular as an avalanche photodiode, receives the reflected measuring signal portions and directs them as an electrical signal to a not-shown evaluation unit 46 of the measuring device 20. The distance determined by the evaluation unit 46 of the measuring device 20 is then reproduced on a display device 50 in a manner that is visible to the user.

Located on a top side 48 of the housing 24 of the distance measuring device 20, are, among other things, the display device 50 and a plurality of push-buttons 52 for the measuring device 20, with which said push-buttons different measurement modes can be selected, for example. The actual measurement procedure for measuring distance is triggered by means of a separate start button 54.

FIG. 2 also shows the top part of a tripod 12, which serves as mechanical holding element 13 for the measuring device and upon which the distance measuring device 20 can be placed in the direction of the arrow 15. In the exemplary embodiment of the device according to the invention shown in FIG. 2, the tripod 12 comprises two cubic bolts 56 and 58, with which the measuring device 20 can be connected as alternatives. A corresponding receiving element 28 having a rectangular recess 60 for the one connecting bolt 56 or the second bolt 58 is developed in the underside 26 of the housing 24 of the distance measuring device 20 for this purpose, as shown clearly in the drawings in FIGS. 3 and 4. In other exemplary embodiments, other connecting methods known to one skilled in the art can also be used for mounting and contacting, such as polygonal bolts or receiving elements or corresponding thread fits.

Figure 3:
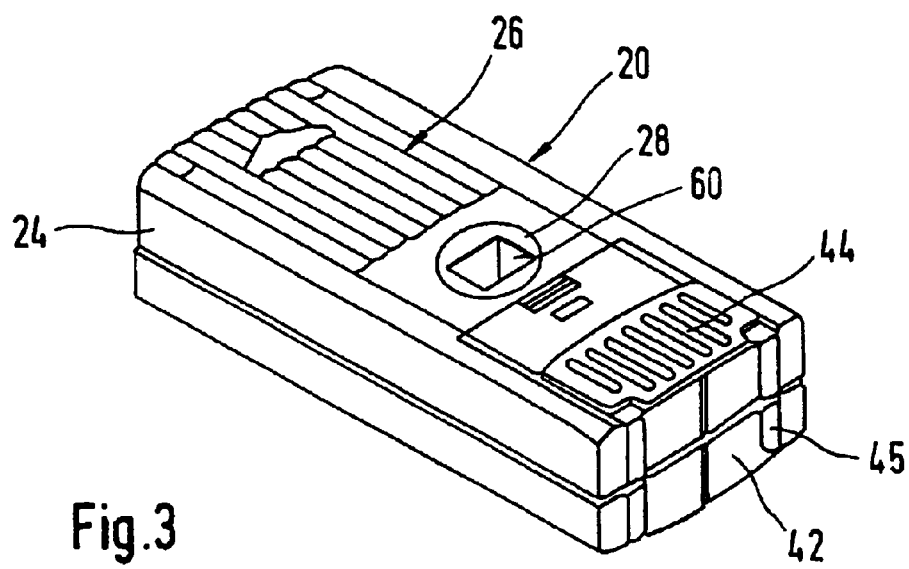
FIG. 3 shows the laser distance measuring device in FIG. 2 as viewed at an angle from below.
Figure 4:
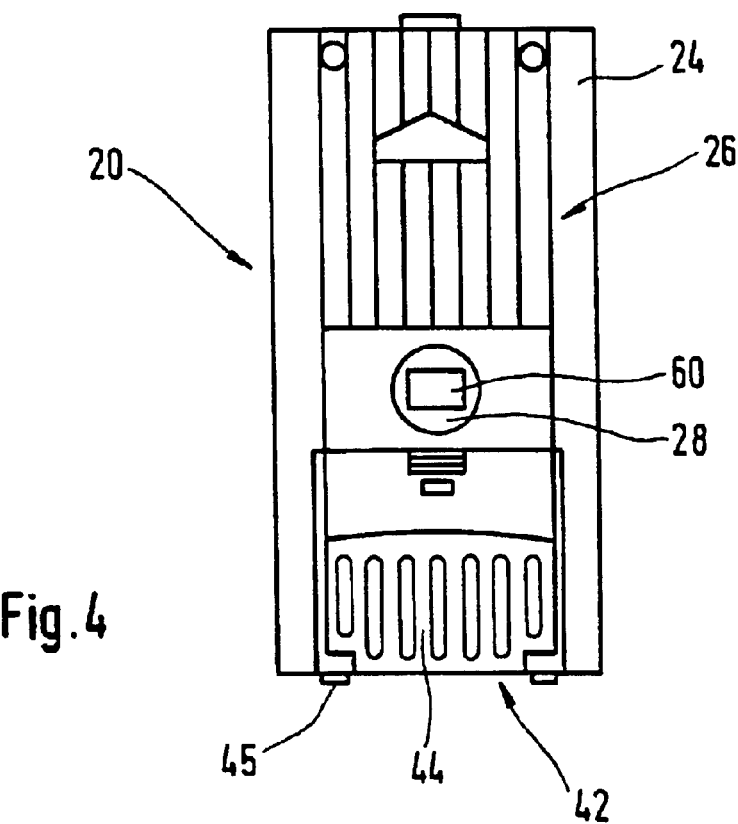
FIG. 4 shows the laser distance measuring device in FIG. 2 and FIG. 3 as viewed directly from below.

The underside 26 of the housing 24 of the device 10 according to the invention is shown in two different perspectives in FIG. 3 and FIG. 4. FIG. 3 shows the laser distance measuring device from below in a slanted, perspective view, while FIG. 4 shows the laser distance measuring device in FIG. 2 and FIG. 3 directly from the bottom once more for clarification purposes.

The receiving element 28 for a mechanical holding element 13 of the measuring device 20 is turnably inserted in the housing underside 26. Furthermore, the housing underside 26 comprises a locating flap 44 in the region of the edge of the housing backside 42, which said locating flap can be folded out during handheld operation of the measuring device 20 in order to enable precise placement of the measuring device 20 on an external reference edge. Locating profiles 45 are provided on the housing backside 42 for the same purpose, which said locating profiles mark the internal reference plane of the device 20.

Using a first screw 62, the height of the tripod 12 shown in a sectional view in FIG. 2 and, therefore, the height of a measuring device 20 placed on the tripod 12 can be adjusted as desired. A second screw 64 permits bolt 56 and, in particular, bolt 58 of the tripod unit 12 to swivel in a horizontal plane and to be fixed in the desired position. In this fashion, it is easy to orient the measuring device 20 placed on bolt 56 or 58 relative to a target object in desired fashion.

The tripod receiving element 28 is also supported in the housing 24 of the measuring device in a fashion that permits it to rotate around an axis. The distance measuring device 20 can therefore be rotated by 360° on bolt 56 in a horizontal plane. If the measuring device 20 is placed on bolt 58 as an alternative, the device can swivel by 360° in a vertical plane. The housing 24 can also comprise an angle sensor (not described in detail) that is interconnected with the receiving element 28 and is capable of being detected via a corresponding pivot angle of the receiving element 28 of the distance measuring device 20.

Figure 5:
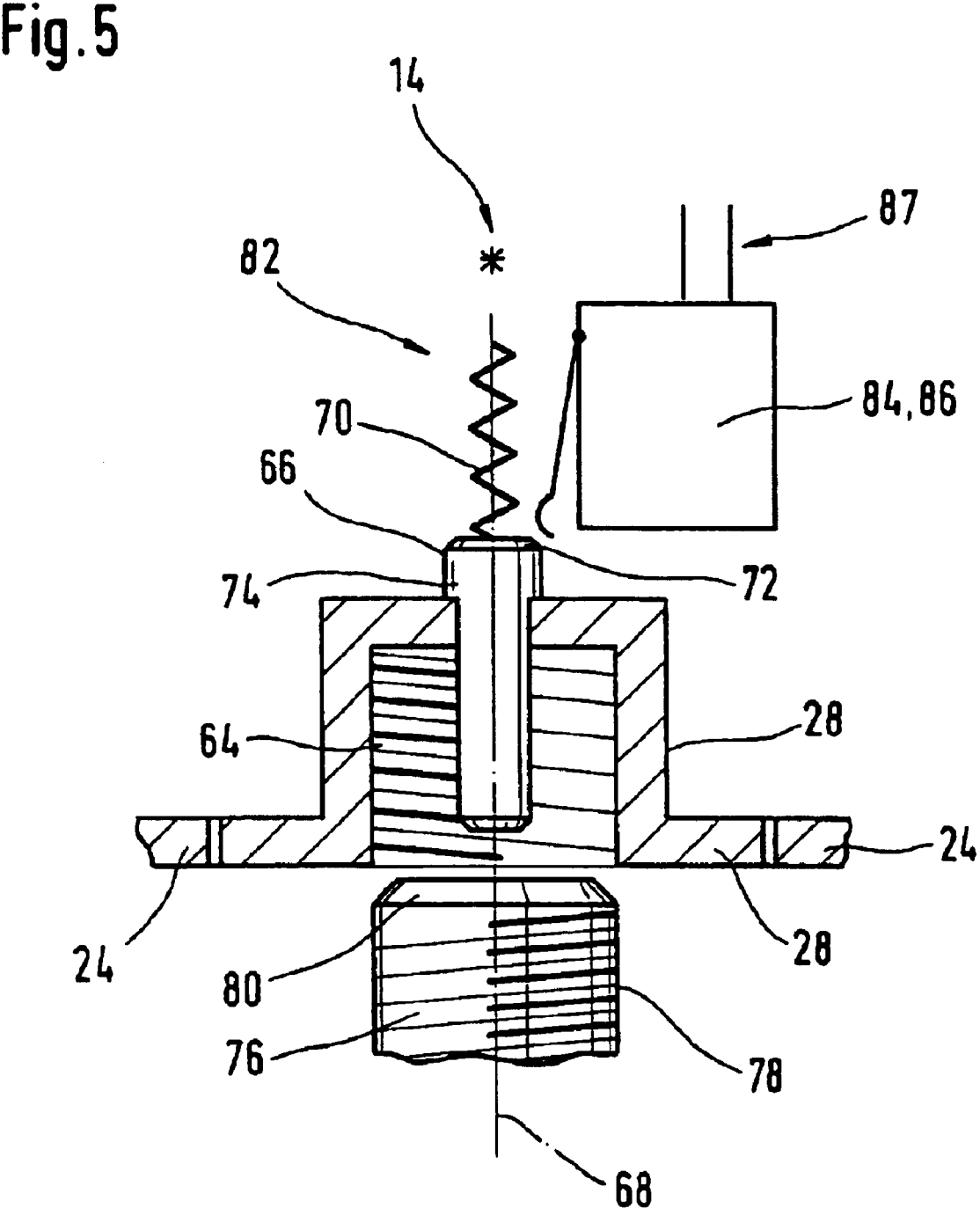
FIG. 5 shows the underside of the housing in the region of a holding receiving element in a detained view of a further exemplary embodiment of a distance measuring device according to the invention.

FIG. 5 shows a detained view of an alternative exemplary embodiment of the device according to the invention. Said figure shows a side view only of the region of a holding receiving element 28 of a housing 24 of a corresponding measuring device 20. Components having identical functions are labelled in FIG. 5 with the same reference numerals as in the previous figures, to facilitate clarity.

The receiving element 28 of the device 10 according to the invention according to the exemplary embodiment in FIG. 5 comprises an internal thread 64. Additionally, a movable pushrod 66 that is capable of being displaced in the direction of the vertical axis is located in the holding receiving element 28. The pushrod 66 is pressed into the receiving element 28 by means of a spring element 70 that is located inside the housing 24 of the measuring device 20 and acts on the end 72 of the pushrod 66 situated inside the housing. A safeguard mechanism 74 ensures that the pushrod 66 does not fall out of the housing 24.

The mechanical holding element 13 for holding the measuring device, which is not shown in detail, is equipped with a corresponding threaded bolt 76 that comprises an external thread 78 onto which the housing 24 of the measuring device 20 can be screwed. When the measuring device 20 is screwed onto the threaded bolt 76 of the holding element 13, the pushrod 66 is pressed by an end surface 80 of the threaded bolt 76, against the spring force of the spring element 70, into the housing interior 82 of the measuring device 20. A switching element 84 is located in the housing interior 82, which said switching element is shown as a simple switch 86 in the exemplary embodiment shown. The switch 86 is actuated when the pushrod 66 is pushed into the housing interior 82, and a not-shown current circuit 87 is closed.

In this manner, a signal is produced in the electronic system of the measuring device 20 that signals to the evaluation unit 46 of the device 10 according to the invention that a holding element 13 is being used, and the reference point 14 for the distance measurement (zero point for the path to be determined) must be displaced in the axis 68 of the holding element 13. When distance measurements are performed with the aid of a holding element or a tripod, the reference plane or the reference point of the measuring device can therefore be changed automatically without requiring user intervention, e.g., by operating a button on the keypad of the measuring device.

The device according to the invention is not limited to the exemplary embodiments described in the examples.

For example, the device according to the invention is not limited to the use of a tripod. In other, not shown, advantageous exemplary embodiments of the invention, for example, other holding elements serving to secure the measuring device can be used. When said holding elements are used, a corresponding detector or a switching element generates a signal that signals to the evaluation unit that the reference point for the distance measurement must be changed. It is possible, for example, to use a wall holding element or adapters in similar fashion to mechanically interconnect the device according to the invention with other measuring devices, machines or vehicles.

The device according to the invention is not limited to the use of a mechanical switch as switching element.

In a further, not explicitly shown exemplary embodiment of the device according to the invention, the tripod receiving element 28 or the corresponding receiving element for a different type of holding element can be equipped with a magnet sensor, e.g., in the form of a Hall sensor in or on the device, in order to detect an inserted holding element for the measuring device.

A split, metallic threaded bushing that is integrated in the housing of the measuring device is another possible exemplary embodiment. Each of the two halves of the threaded bushing is interconnected with an electronic switching circuit of the distance measuring device. By screwing in a metallic tripod threaded bolt, the two threaded bushings in the housing of the measuring device are interconnected in electrically conductive fashion. This can be detected in an electronic circuit and transmitted to the evaluation unit of the measuring device.

It is also feasible and assumed that the screwing-in or insertion of a holding bolt for the measuring device is detected capacitively, and said detection is forwarded to a corresponding electronic circuit. In this case, non-metallic or non-magnetic connecting means can also be detected in advantageous fashion.

If the distance measuring device according to the invention with its connecting means integrated in the housing is screwed onto a tripod, for example, this is detected by an electronic circuit and taken into consideration in the measured value displayed in the display field of the measuring device. It is also possible in a further exemplary embodiment of the device according to the invention to symbolically depict a corresponding display of the reference edge active at that moment, i.e., a tripod axis or the housing front side, for example, in the display field of the measuring device according to the invention. In this case, the user knows which reference point was used as the starting point for the measured path, thereby allowing a backup for safeguarding purposes to be carried out easily at any time.

The device according to the invention can be used with principally hand-held laser distance measuring devices, for example, in the case of which a tripod is occasionally employed, that is, a static measurement is carried out from a tripod or another mechanical holding element of the device.

Moreover, the device according to the invention is not limited to the use of laser distance measuring devices. Rather, said device can also be used for ultrasonic measuring devices or other measuring devices which determine a path length.

What is claimed is:

1. A device (10) for distance measurement, comprising a housing (24) and an emitting unit (32) for a measuring signal (34, 36) accommodated in the housing (24), a receiving unit (38) for the measuring signal returned from a target object (16, 18), an evaluation unit (46) for determining a distance (d) of at least one reference point (14) between the housing (24) and the target object (16, 18), a display device (50) which reproduces said distance (d), and at least one receiving element (28) which is connected to the housing (24) and receives a holding element (12, 13), wherein means (66, 84, 86) are provided in or on the housing (24) of the device (10) for detecting an inserted holding element (12, 13) and automatically transmitting the reference point (14) of the distance measurement to the evaluation unit (46), said reference point being used for a measurement with the aid of the holding element (12, 13).

2. A device (10) for distance measurement, comprising a housing (24) and an emitting unit (32) for a measuring signal (34, 36) accommodated in the housing (24), a receiving unit (38) for the measurement signal returned from a target object (16, 18), an evaluation unit (46) for determining a distance (d) of at least one reference point (14) between the housing (24) and the target object (16, 18), a display device (50) which reproduces said distance (d), and at least one receiving element (28) which is connected to the housing (24) and receives a holding device (12, 13).

wherein means (66, 84, 86) are provided in or on the housing (24) of the device (10) for detecting an inserted holding element (12, 13) and automatically transmitting the reference point (14) of the distance measurement to the evaluation unit (46), said reference point being used for a measurement with the aid of holding element (12, 13), wherein the means (66, 84, 86) comprise a detector (66) and at least one switching means (84,86).

3. The device according to claim 2, wherein the at least one switching means (84, 86) and/or the detector (66) is a mechanical switch (86).

4. The device according to claim 2, wherein the switching means (84, 86) and/or the detector (66) is an electrical contact.

5. The device according to claim 2, wherein a capacitive detector is integrated in the device (10).

6. The device according to claim 2, wherein the detector is a Hall sensor which detects a magnetic field.

7. The device according to claim 1 or 2, wherein the reference point (14) detected by the evaluation unit (46) is displayed in the display device (50) of the device.

8. The device according to claim 1 or 2 wherein the measuring signal (36) for distance measurement is an optical signal, in particular a laser beam (34).

9. The device according to claim 1 or 2, wherein the holding element (12, 13) of the device (10) is a tripod (12).

* * * * *